(12) United States Patent
Jordan, Sr.

(10) Patent No.: US 8,847,425 B2
(45) Date of Patent: Sep. 30, 2014

(54) HYBRID ENERGY HARVESTING DEVICE AND FIXED THRESHOLD POWER PRODUCTION

(71) Applicant: Donnie E. Jordan, Sr., Big Bear Lake, CA (US)

(72) Inventor: Donnie E. Jordan, Sr., Big Bear Lake, CA (US)

(73) Assignee: Donnie E. Jordan, Sr., Henderson, NV (US)

( * ) Notice: Subject to any disclaimer, the term of this patent is extended or adjusted under 35 U.S.C. 154(b) by 0 days.

(21) Appl. No.: 13/856,151

(22) Filed: Apr. 3, 2013

(65) Prior Publication Data

US 2013/0264829 A1     Oct. 10, 2013

Related U.S. Application Data

(60) Provisional application No. 61/599,869, filed on Apr. 4, 2012, provisional application No. 61/761,081, filed on Feb. 5, 2013.

(51) Int. Cl.
*F03D 9/00* (2006.01)
*H02P 9/04* (2006.01)

(52) U.S. Cl.
CPC ............. *F03D 9/007* (2013.01); *Y02B 10/70* (2013.01); *Y02E 10/72* (2013.01); *Y02B 10/30* (2013.01)
USPC .............................................. 290/55; 290/44

(58) Field of Classification Search
CPC ......... F03D 9/002; F03D 11/00; F03D 1/065; F03D 9/007; F03D 3/005; Y02B 10/30; Y02B 10/70; Y02E 10/721; Y02E 10/725; Y02E 10/74; Y02E 10/223; Y02E 10/50; Y02E 10/70; H02K 7/183

USPC ........................................................ 290/44, 55
See application file for complete search history.

(56) References Cited

U.S. PATENT DOCUMENTS

| | | | | |
|---|---|---|---|---|
| 4,119,863 A | * | 10/1978 | Kelly | 290/55 |
| 4,200,904 A | * | 4/1980 | Doan | 362/183 |
| 4,551,631 A | * | 11/1985 | Trigilio | 290/55 |
| 5,075,564 A | * | 12/1991 | Hickey | 290/55 |

(Continued)

FOREIGN PATENT DOCUMENTS

| | | |
|---|---|---|
| DE | 20 2005 018 937 U1 | 3/2006 |
| KR | 10-2012-0082186 | 7/2012 |
| KR | 10-1169546 B1 | 7/2012 |
| WO | WO 2011/134054 A1 | 11/2011 |

OTHER PUBLICATIONS

PCT International Search Report of PCT/US13/59802; dated Feb. 26, 2014 (2 pgs.).

(Continued)

*Primary Examiner* — Pedro J Cuevas
(74) *Attorney, Agent, or Firm* — Blake W. Jackson; DLA Piper LLP (57) ABSTRACT

Systems and methods for harvesting energy including a turbine having a base, at least two protruding blades, and a center portion. The turbine base is configured to be rotatable and connected to an electric motor. The electric motor is configured for power generation. The at least two protruding blades are configured to include solar energy collection devices. The center portion is configured to include a kinetic energy harvesting device. And the electric motor, the solar collection devices and the kinetic energy harvesting device are connected to a home circuit.

20 Claims, 11 Drawing Sheets

(56) References Cited

U.S. PATENT DOCUMENTS

| | | | | |
|---|---|---|---|---|
| 5,221,186 A * | 6/1993 | Machin | | 416/61 |
| 5,254,876 A * | 10/1993 | Hickey | | 290/55 |
| 6,661,113 B1 * | 12/2003 | Bonin | | 290/55 |
| 7,105,940 B2 * | 9/2006 | Weesner et al. | | 290/44 |
| 7,172,386 B2 * | 2/2007 | Truong et al. | | 415/4.1 |
| 7,230,819 B2 * | 6/2007 | Muchow et al. | | 361/601 |
| 7,321,173 B2 * | 1/2008 | Mann | | 290/55 |
| 7,339,286 B1 * | 3/2008 | Chen | | 290/55 |
| 7,345,374 B1 * | 3/2008 | Jones et al. | | 290/44 |
| 7,434,636 B2 * | 10/2008 | Sutherland | | 180/2.2 |
| 7,453,167 B2 * | 11/2008 | Gilbert | | 290/55 |
| D595,885 S * | 7/2009 | Daidone et al. | | D26/69 |
| D610,732 S * | 2/2010 | Daidone et al. | | D26/71 |
| D622,887 S * | 8/2010 | Lewis | | D26/71 |
| 7,808,127 B2 * | 10/2010 | Teggatz et al. | | 307/84 |
| 7,821,147 B2 * | 10/2010 | Du Bois | | 290/44 |
| D626,686 S * | 11/2010 | Daidone et al. | | D26/155 |
| 7,851,935 B2 * | 12/2010 | Tsao | | 290/44 |
| 7,888,590 B2 * | 2/2011 | Niederer | | 136/251 |
| 7,937,955 B2 * | 5/2011 | Tsao | | 62/6 |
| 7,964,981 B2 * | 6/2011 | Tsao | | 290/44 |
| 8,146,219 B2 * | 4/2012 | Monostory | | 29/55 |
| 8,206,106 B2 * | 6/2012 | Syrovy | | 416/83 |
| 8,278,868 B2 * | 10/2012 | Caudill | | 320/101 |
| 8,288,884 B1 * | 10/2012 | Malcolm | | 290/55 |
| 8,295,033 B2 * | 10/2012 | Van Straten | | 361/601 |
| 8,299,645 B2 * | 10/2012 | Muchow et al. | | 290/55 |
| 8,330,296 B2 * | 12/2012 | Ottman | | 307/72 |
| 8,338,977 B2 * | 12/2012 | Lee et al. | | 290/44 |
| D679,847 S * | 4/2013 | Arnold et al. | | D26/70 |
| 8,432,053 B2 * | 4/2013 | Frayne | | 290/44 |
| 8,536,720 B2 * | 9/2013 | Bates et al. | | 290/44 |
| 8,564,147 B1 * | 10/2013 | Sharp | | 290/44 |
| 8,654,512 B2 * | 2/2014 | Van Straten | | 361/601 |
| 2005/0218657 A1 * | 10/2005 | Weesner et al. | | 290/55 |
| 2006/0137348 A1 * | 6/2006 | Pas | | 60/641.1 |
| 2006/0210389 A1 * | 9/2006 | St-Germain et al. | | 415/4.2 |
| 2006/0213697 A1 * | 9/2006 | Sutherland | | 180/2.2 |
| 2007/0090653 A1 * | 4/2007 | Martelon | | 290/55 |
| 2008/0037243 A1 * | 2/2008 | Discoe et al. | | 362/183 |
| 2008/0042446 A1 * | 2/2008 | Kurtz | | 290/55 |
| 2008/0047270 A1 * | 2/2008 | Gilbert | | 60/641.12 |
| 2008/0196758 A1 * | 8/2008 | McGuire | | 136/245 |
| 2009/0128085 A1 * | 5/2009 | Yang | | 320/101 |
| 2009/0134631 A1 | 5/2009 | Guerrero et al. | | 290/1 R |
| 2009/0160258 A1 | 6/2009 | Allen et al. | | 307/82 |
| 2009/0186745 A1 * | 7/2009 | Lewiston | | 482/2 |
| 2009/0261595 A1 * | 10/2009 | Poo | | 290/55 |
| 2009/0273922 A1 * | 11/2009 | Ho et al. | | 362/183 |
| 2010/0026100 A1 * | 2/2010 | Teggatz et al. | | 307/82 |
| 2010/0090605 A1 * | 4/2010 | Nevins | | 315/159 |
| 2010/0101988 A1 * | 4/2010 | Saeed et al. | | 210/171 |
| 2010/0107633 A1 * | 5/2010 | Tsao | | 60/641.8 |
| 2010/0117372 A1 * | 5/2010 | McMaster | | 290/55 |
| 2010/0133820 A1 * | 6/2010 | Tsao | | 290/44 |
| 2010/0133850 A1 * | 6/2010 | Winkler | | 290/55 |
| 2010/0170293 A1 * | 7/2010 | Tsarev et al. | | 62/476 |
| 2010/0207453 A1 * | 8/2010 | Ottman | | 307/72 |
| 2010/0219643 A1 * | 9/2010 | Biucchi et al. | | 290/55 |
| 2010/0221111 A1 * | 9/2010 | Nieuwenhuizen | | 416/61 |
| 2010/0258449 A1 * | 10/2010 | Fielder | | 205/628 |
| 2010/0270808 A1 * | 10/2010 | Bates et al. | | 290/55 |
| 2010/0314876 A1 * | 12/2010 | Frayne | | 290/44 |
| 2011/0080007 A1 * | 4/2011 | Tsao | | 290/4 R |
| 2011/0133454 A1 * | 6/2011 | Vo | | 290/44 |
| 2011/0169334 A1 * | 7/2011 | Williams | | 307/72 |
| 2011/0176256 A1 * | 7/2011 | Van Straten | | 361/601 |
| 2011/0204644 A1 * | 8/2011 | Perregrini | | 290/53 |
| 2011/0215583 A1 | 9/2011 | Lee et al. | | 290/55 |
| 2011/0221203 A1 * | 9/2011 | Miller | | 290/55 |
| 2012/0026320 A1 * | 2/2012 | Bryceland et al. | | 348/135 |
| 2012/0112546 A1 * | 5/2012 | Culver | | 307/66 |
| 2012/0137684 A1 * | 6/2012 | Yogev et al. | | 60/641.14 |
| 2012/0187698 A1 * | 7/2012 | Bassett | | 290/55 |
| 2012/0235410 A1 * | 9/2012 | Serrano | | 290/50 |
| 2012/0250359 A1 | 10/2012 | Knill | | 363/17 |
| 2012/0273069 A1 * | 11/2012 | Klicpera et al. | | 137/551 |
| 2013/0001950 A1 * | 1/2013 | Armstrong | | 290/55 |
| 2013/0002189 A1 * | 1/2013 | Van Straten | | 320/101 |
| 2013/0101415 A1 * | 4/2013 | Nieuwenhuizen | | 416/5 |
| 2013/0106193 A1 * | 5/2013 | Bryson | | 307/73 |
| 2013/0170949 A1 * | 7/2013 | Samuels | | 415/1 |
| 2014/0097622 A1 * | 4/2014 | Bates et al. | | 290/55 |

OTHER PUBLICATIONS

PCT Written Opinion of the International Searching Authority of PCT/US13/59802; dated Feb. 26, 2014 (9 pgs.).

\* cited by examiner

HYBRID ENERGY HARVESTING DEVICE AND FIXED THRESHOLD POWER PRODUCTION

CROSS-REFERENCE TO RELATED CASES

This patent application claims priority from and is related to U.S. provisional application 61/599,869 filed on Apr. 4, 2012 and U.S. provisional application 61/761,081 filed on Feb. 5, 2013, both of which are incorporated by reference in its entirety.

BACKGROUND

Aspects of this application relate to the field of hybrid energy harvesting and the capabilities of multiple natural elements working together simultaneously, to support and enhance one another in producing energy.

The field of energy harvesting has been rooted in singular methods and systems of harvesting. Further, it has focused on maximizing large output at sporadic intervals.

SUMMARY

Systems disclosed here include systems for harvesting energy. Some embodiments include a turbine having a base, at least two protruding blades, and a center portion. Also, the turbine base is configured to be rotatable and connected to an electric motor. Further, the electric motor is configured for power generation and where the at least two protruding blades are configured to include solar energy collection devices. The center portion may be configured to include a kinetic energy harvesting device. The electric motor, the solar collection devices and the kinetic energy harvesting device may be connected to a home circuit as well.

Certain embodiments include the system also having a grid-tie inverter provided between the home circuit and an electric grid. And the system could include where the grid-tie inverter includes from one to three stages.

Embodiments could have the grid-tie inverter including a boost converter stage. Further, certain examples have the grid-tie inverter including a pulse-modulated DC-to-DC converter stage. And the grid-tie inverter could include a DC-to-AC conversion stage.

Examples also include systems with at least two protruding blades extend upwardly from the base each have two portions, one angled out from the base, and the other angled back into the base. And the at least two protruding blades can also extend from the rotatable base to a commonly shared portion, the commonly shared portion connecting the at least two protruding blades with the kinetic energy harvesting device.

Some example embodiments include the system with at least two energy harvesting devices, connected by a network. And also, where the network is at least one of a wireless and a wired network. Further, the network can be connected to an energy storage system, configured to receive the harvested energy from the networked system. Also the home circuit could be configured to produce consistent voltage output.

Example systems here also include configurations where the home circuit is configured to produce constant current output. Also, they may include where a threshold voltage level determining circuit connected to the home circuit. And systems where the kinetic energy harvesting device is at least one of a piezoelectric device and a microphone device.

Further, systems may have the home circuit configured to be connected to, and power a street light.

Some example embodiments may include where the at least two protruding blades having an interior side toward the center and an exterior side, the solar energy collection devices located on the exterior side. And some embodiments may have the electric motor, the solar collection devices and the kinetic energy harvesting devices connected in parallel to the home circuit.

Configurations of the systems and methods here may have the electric motor, the solar collection devices, the kinetic energy harvesting devices and the battery connected in parallel. Also the electric motor, the solar collections devices, the kinetic energy harvesting devices, the battery, a power grid and an electrical device connected in parallel.

Certain example embodiments could include systems with the home circuit including a charge control circuit regulating and discharging harvested energy to at least one of a battery, a power grid and electrical device. Systems and methods could also include the solar collection devices and the kinetic energy harvesting devices connected in parallel to the wireless network.

Some examples can have the wireless network provides wireless power transfer to the home circuit and the electric motor connected to the wired network.

Embodiments may include the wired network connected in parallel to the wireless network. Also, the electric motor, the solar collection devices and the kinetic energy harvesting devices connected in series to the home circuit.

Some examples include a system for harvesting energy. These example systems could have a hybrid energy harvesting device having a base, a turbine with at least one vertically arranged and angled protruding blade, and a center portion. Further, they could have the base configured to be a rotatable and in connection to an electric generator and the at least one protruding blade is configured to include solar energy collection portions. These examples could also have the center portion configured to include a kinetic energy harvesting device.

Embodiments may also include methods of harvesting energy. These methods could be conducted via a hybrid energy harvesting device including generating electricity from a spinning a turbine. Also, collecting solar energy from a solar collection device and collecting kinetic energy from a kinetic energy harvesting device. These embodiments could have the turbine having at least two vertically arranged blades mounted on a rotatable base and at least two turbine blades configured to include solar collection portions.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

Aspects of the inventions disclosed here include natural energy harvesting devices, designed to harness energy from more than one natural source. In certain examples, these hybrid energy harvesting devices produce a near-constant supply of electricity from the multiple sources. These Hybrid Energy Harvesting Devices ("HEHD") can be deployed in a network throughout a geographic area in order to harvest energy from as many advantageous positions as possible, depending on the modes of energy harvesting that the particular HEHD employs.

Hybrid Energy Harvesting Devices—HEHDs

Disclosed here are innovations that allow for harvesting of multiple sources of natural energy in one device creating a hybrid to produce a consistent voltage collection that can be used, in certain examples, for various sized, including large-scaled energy applications. And by adding more than one type of harvesting technology to a single device, the ebb and flow of natural harvesting from a single source can be augmented by other technologies integrated into such a device. In this way, consistent with the inventions disclosed here, the hybrid device itself can become more reliable as a power source, and able to produce energy in more than one natural harvesting environment.

Some power densities available from single source/incremental energy harvesting devices such as solar panels, wind turbines and other sources are highly dependent upon the specific application and the design itself of the harvesting generator which could affect the generator's size. Additionally, the variable output of most scalable, natural energy harvesting configurations allows for the moments when devices must rest at zero volts or at a point where there is no positive voltage output. The variable aspect of current single source/incremental harvesting devices is for the moments of natural interruption when power output drops to zero from insufficient resources such as sun, wind, or other resources.

Figure 1:
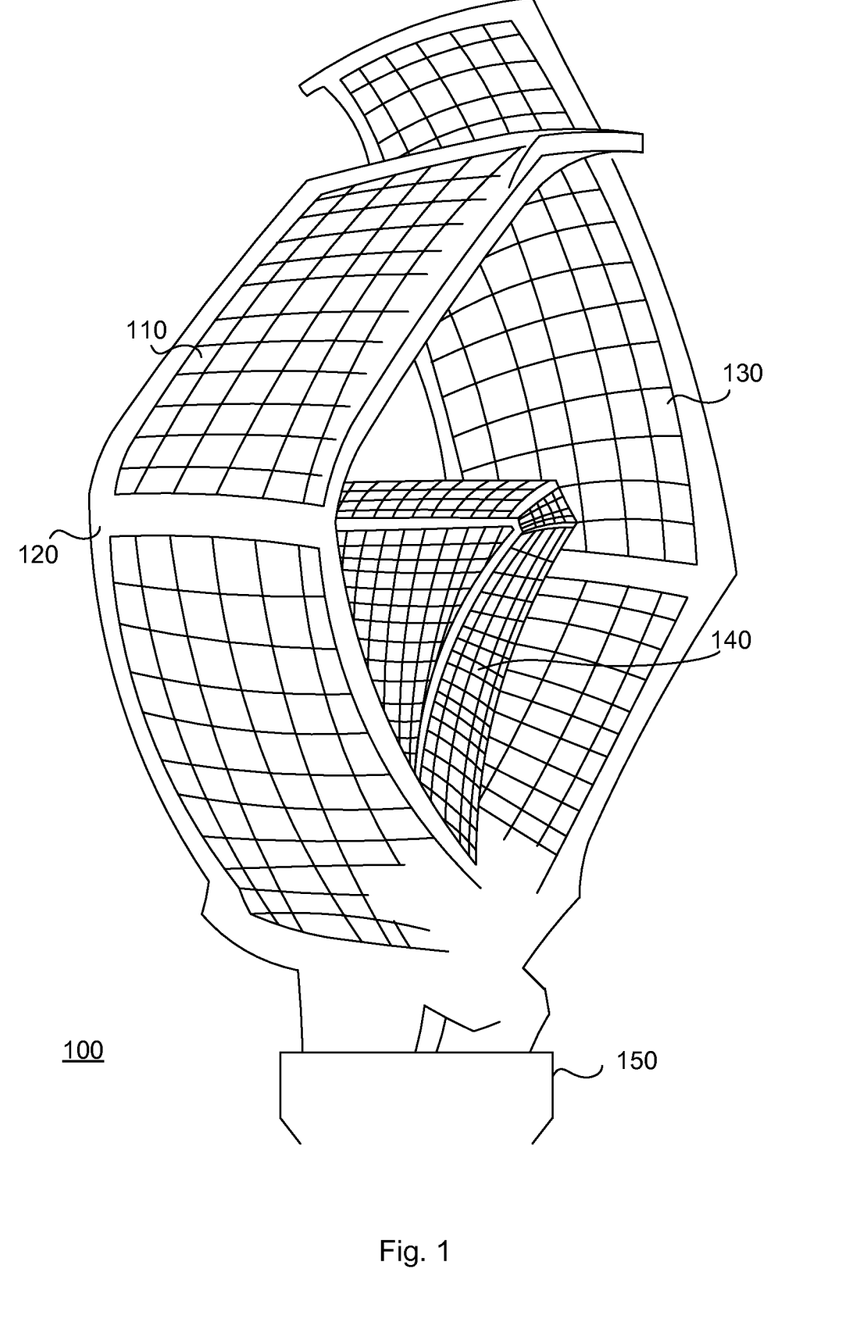
FIG. 1 is an illustration showing an example embodiment of a vertical axis energy harvesting turbine consistent with certain embodiments.

FIG. 1 is an illustration showing an example embodiment of an HEHD 100 in the form of a Vertical Axis Energy Harvesting Turbine ("VAEHT"). The VAEHT is a stand-alone device with multiple energy harvesting technologies built onto a vertical axis. Such an example could be configured to take advantage of wind power coming from all 360 degrees and some variations on the basic design can gain extra power from wind that blows from the top to the bottom or from the bottom to the top of the vertical axis while also harvesting for solar and kinetic energy. For example, the VAEHT in FIG. 1 shows such a device with an oscillating section 150 supporting two upwardly sweeping blades 120 and 130. The upwardly sweeping blades shown here only number two but any number of blades, from one to many, could be used. The blades are arranged such that wind coming from multiple angles, would cause the device to turn or spin on its base 150. Further, in the example shown in FIG. 1, the upwardly sweeping blades 120 and 130 are curved and at a canted position. This curved and canted positioning allows for wind coming from above, below, or any direction to cause the turbine to spin. Thus, the blades 120 and 130 act as a wind turbine and this example is configured to be able to harness wind energy from multiple angles.

Also, as shown in FIG. 1, the example VAEHT upwardly sweeping blades 120 and 130 are multifunctional. This is because the upwardly sweeping blades, 120 and 130 are not only the blades of the wind turbine, that spins the entire device on its base 150, but the blades also have other technologies included as well. One such example would be photovoltaic or solar cells 110 and 130 embedded or attached. These photovoltaic or solar cells could be attached in order to harvest as much solar energy as possible while either stationary or rotating. In this example, the photovoltaic or solar cells cover as much surface area of the upwardly sweeping blades 120 and 130 as possible. And because the VAEHT spins if acted upon by the wind, it is advantageous to place the solar cells on all surfaces of the upwardly sweeping blades. Other example embodiments allow for the solar cells to be placed only on the areas of the blades that receive the most direct solar radiation, allowing for the areas that do not, to be left without solar cells. Any combination of cellular arrangement on the blades is useful to capture and harvest solar energy.

The example shown in FIG. 1 also includes a kinetic energy harvesting device #4 and on the reverse side of the sweeping blades 110 and 130. The device #4, shown at the center position of the upwardly sweeping blades 120 and 130 is positioned to recover any amplified kinetic energy from the entire device, by the positions of the surfaces and/or by the oscillating or spinning base section 150 and movement of the device. The kinetic energy harvesting device 140 could be any kind of acoustic or electrostatic energy harvested by piezo-electric cells or flexible elastomers are also classified as kinetic energy. Kinetic energy is additionally generated by an oscillating mass, wind, rain and other natural and manufactured elements. To collect acoustic energy amplified by the positions and shapes of the device's wind and solar energy harvesting surfaces, an acoustic/kinetic energy receiver, should be placed near the center point of the device. In the example of FIG. 1, the kinetic device is between the wind harvesting panels. Other embodiments allow for the collection to be funneled in different areas of the device and collected as well.

Figure 2:
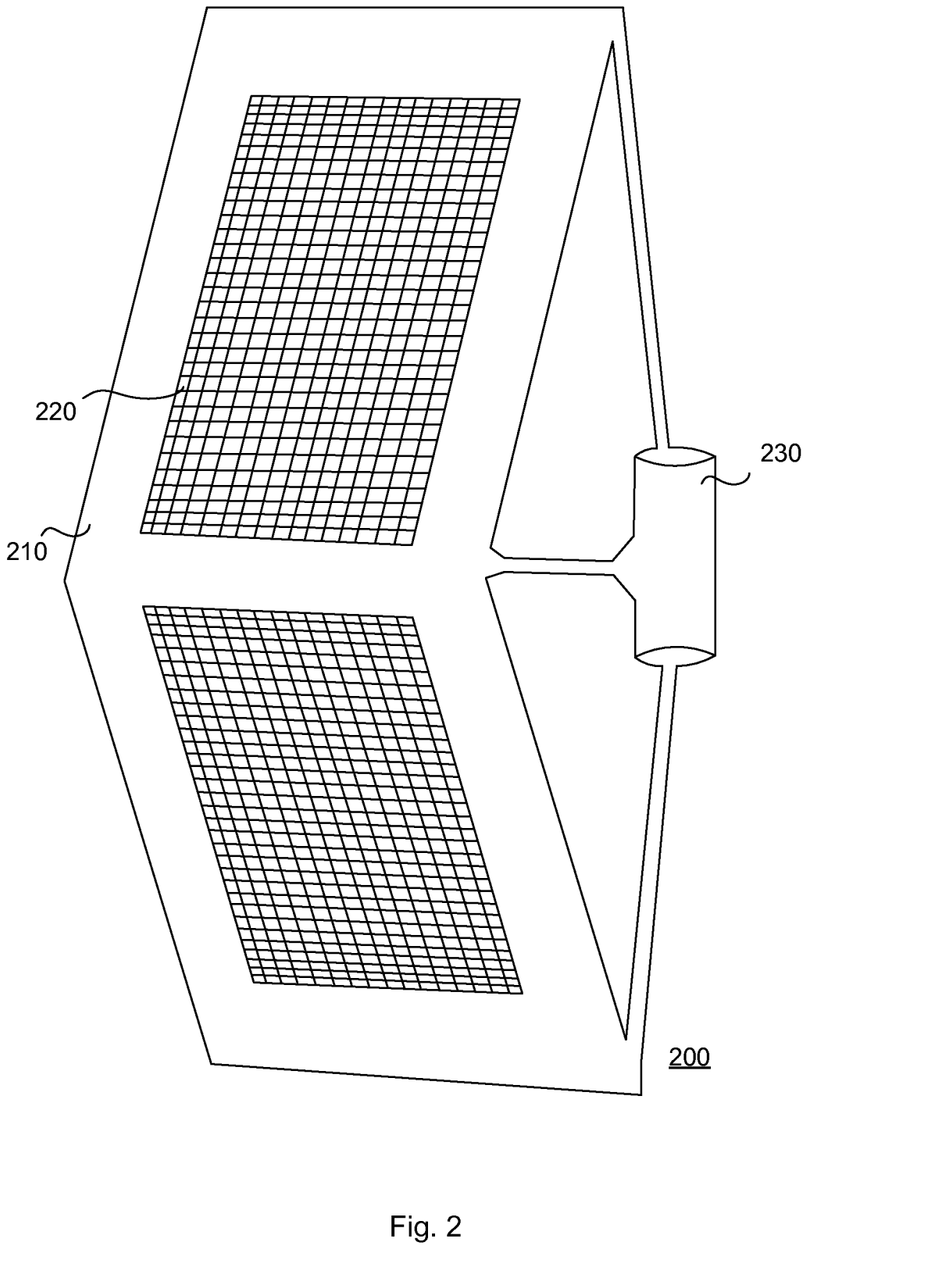
FIG. 2 is an illustration showing another example embodiment of a hybrid energy harvesting device consistent with certain embodiments.

FIG. 2 shows another example HEHD 200 with a curved canvas 210 that houses a multifunctional, such as solar/kinetic, energy harvesting surface 220. The surface can be combined with additional like surfaces. The chassis arm 230 can be used to connect or mount the surface to an oscillating section to drive the power generator. Thus, creating a device that can harvest energy from solar, wind and piezoelectric sources.

Figure 3:
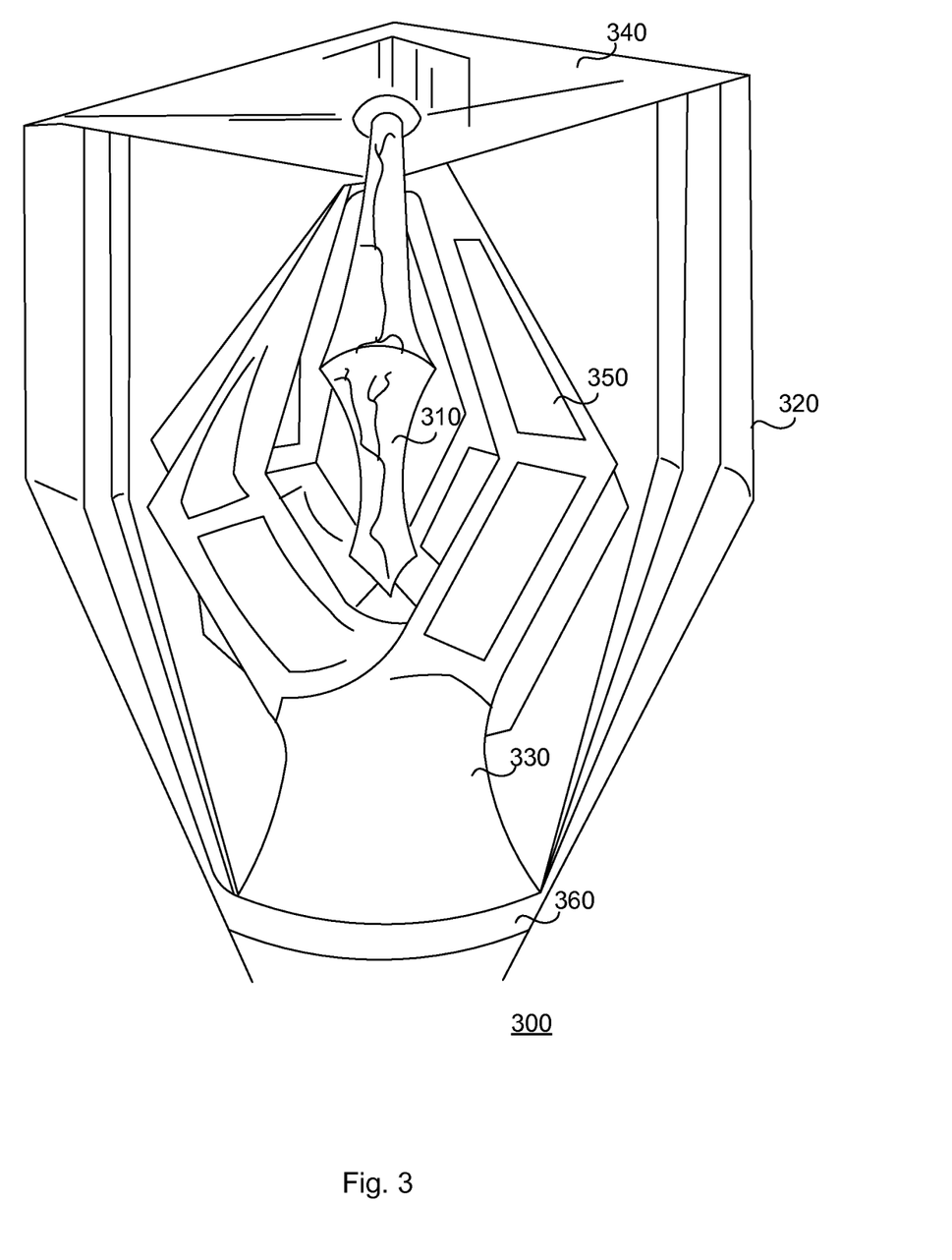
FIG. 3 is an illustration of another example hybrid energy harvesting device consistent with certain embodiments.

FIG. 3 shows another example HEHD 300. This illustration includes three harvesting elements, solar, wind, and kinetic, in one device. Set on a singular vertical axis 340 where a solar or solar/kinetic energy harvesting surface is stationary and positioned at top, a kinetic energy harvesting surface 310 is stationary at center and two or more weather resistant surfaces 350 are curved, canted and positioned to recover wind & kinetic energy from up to 360 degrees and when possible, from the top and bottom directions. Arm 320 serves as a conduit for a wired and/or wireless power transfer and as a mounting bracket for the top portion of the device. 330 A cogged oscillating section drives the gear shaft of the stationary PMW motor/generator housed inside 360 the base or service pole.

The VAEHT example that is shown in FIG. 3 is shown as having a "vertical" axis, relative to its base. However, the invention is applicable to devices on either a horizontal and vertical axis, or any angle of axis, depending on the orientation of the deployed device's ambient conditions. The blades of the device could be configured as such that wind from any direction could cause rotation of the turbine. The blade surfaces could be canted and positioned to recover as much of the wind, solar and other energy from every angle, around the device. The example configuration shown in FIG. 3 is just one example embodiment that could be used.

The wind turbine generator could take on various forms of configurations. One such example includes a magnetic generator. The magnetic generator could be a brushed or brushless generator, depending on the design. The wiring for the wind turbine generator could run up through the base and the magnets could be housed in both the inside and outside bases to interact and create a charge when the entire device spins about its base.

Figure 9:
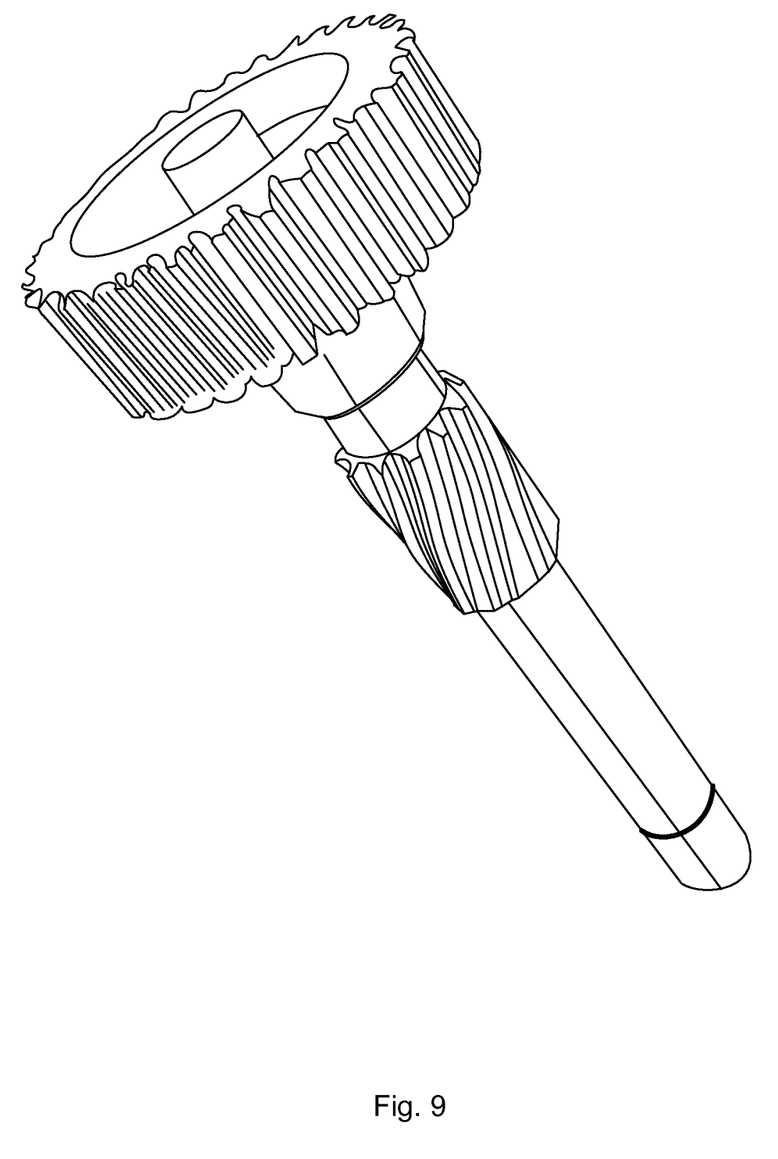
FIG. 9 shows an example of a geared shaft consistent with certain embodiments.
Figure 10:
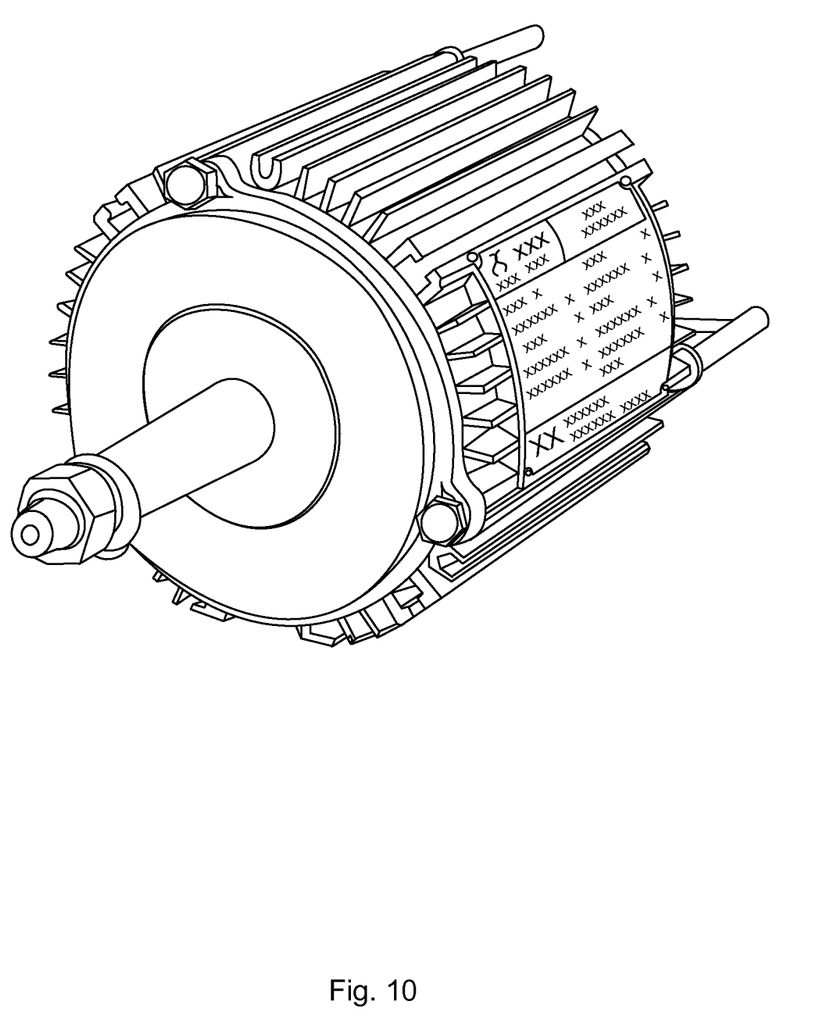
FIG. 10 shows an example of a wind turbine power generator for use in an HEHD consistent with certain embodiments.

An example configuration of the generator could be a pulse width modulation; stepper, induction, brushed or similar capacity motor to serve as a small wind turbine power generator as shown in FIG. 10. The body of the motor/generator could rest inside the mounting base or conduit snugly so that the motor does not shift or move as the device oscillates. An example geared shaft as shown in FIG. 9 that coincides with the cogged oscillating section described in FIG. 6 can be connected with the generator and would allow for the blades to spin freely and mechanically drive the generator by the wind. Also, keeping the wiring below the oscillating portion stationary and safe from damage. The geared and oscillating section can overlap or set inside the rim of the conduit so the oscillating section rotates freely.

If the solar or photovoltaic cells are configured on the wind turbine blades, the wiring connection with the base station will have to include a connection that allows for one side to spin and the other side to stay static. This could be a pin connection, a brushed connection, a magnetic connection, or any connection allowing for this interface. If the solar cells are located on the base portion of the turbine that does not spin, the wiring can run straight through the static base.

As still other examples, the kinetic or piezoelectric portions of the device could be located on the static base portion, and the wind turbine section could revolve around it, as part of the base. If this configuration is used, the wiring could run straight through the base and the spinning turbine blades would not affect the wiring setup. If the kinetic or piezoelectric portions are incorporated in the turbine blades, the wiring could have to be run through a connection that allows for a connection, despite one side of the connection staying static, and the other portion spinning with the turbine portions. As shown on FIG. 6 at 630 where the wireless transfer mechanism is not protruding at the bottom of the oscillating section.

Still other examples of the HEHD implementations herein utilize piezoelectric generators to produce power. Such generators are made of materials that generate a charge when mechanically stressed. Thus, in this example implementation, different aspects of the device could be made of piezoelectric materials and tied into the device such that wind, shaking, oscillating, or any mechanical pressure or stress on the device could produce a charge.

Certain example combinations of these materials along with photovoltaic or solar panels or combinations of kinetic energy harvesting cells in a parallel circuit with solar photovoltaic cells could be used to create a surface that collects energy from multiple sources at once. Alternatively, the blades could contain different energy harvesting technologies. One blade could house piezoelectric and solar technology and another house solar and kinetic. Different combinations can be made and the examples described here are in no way to be construed as limiting the various combinations of the technologies described here.

The size of the HEHD devices could vary. A smaller device, say one or two feet tall, could be useful in placement in smaller areas. A much larger device, several feet tall could also be useful, in areas that have a large expanse of area in which to operate. The relative power output from the different sized devices would vary with the relative size of the device because of not only the wind turbine speeds that could be reached with larger or smaller devices, but the area upon which the solar cells are attached, and the amount of kinetic energy harvested as well.

Still another example of an HEHD could be called a horizontal axis energy harvesting turbine ("HAEHT") design. Such an example could be configured to take advantage of wind power coming from all 360 degrees and some variations on the basic design can gain extra powered from wind that blows from the top to the bottom or from the bottom to the top of the horizontal axis.

Still another example of an HEHD could be called offshore energy harvesting turbine ("OEHT") that could be designed as an off shore device. The design could feature hydroelectric, wave or tidal energy devices at the base or the tower and wind, solar and kinetic devices above the water level. An OEHT could be mounted on a horizontal or vertical axis.

Still another example of an HEHD could be called pivoting energy regenerating loom ("PERL") that could be designed as an off shore device and possesses the similar or different positive attributes as OEHT with additional purposes consisting of a pivoting off shore illumination tower and liquid waste to fuel conversion base.

Still another example of an HEHD could include the additions of thermoelectric, pyroelectric, magnetostatic or many other micro-methods for energy harvesting.

The HEHD devices would likely be placed in very harsh environments and would therefore be best served with some level of weather protection. The HEHD devices should be made to withstand not only many hours of spinning/oscillating on its base, but also harsh wind, rain, sun and dirt exposure. The weather protection could be a plastic or other material case around each blade and section. The electronic wiring should also be shielded from the elements. Thus, each wire should be encased in a weatherproof shield, or placed inside of the body of the device. The oscillating/spinning base should be protected as best as possible from water exposure and allow for the wiring going to and from the device to be water proof or as water resistant as possible.

The material of which HEHDs are made could be any number of materials. Some examples include carbon fiber bodies, lightweight metals such as aluminum or titanium. The bodies of the device could be made of wood, plastics or resins. A consideration for materials is weather resistance including water penetration and resilience. The circuitry of the device should be shielded from the elements so as to increase its reliability. Water tight compartments should house circuits and wiring wherever possible. Water resistant and repellant coatings should be used in wiring, circuitry and connections wherever possible. A hybrid fibrous material can also be woven together with another material such as Teflon or another durable and formable surface suitable for hybrid harvesting.

Wiring components may be packaged discretely, as arrays or networks of like components, or integrated inside of packages such as semiconductor integrated circuits, hybrid integrated circuits and thin or thick film devices. Interfaces formed using a conductive material including metals, a flexible substrate and a conductive fiber, or conductive gels may also be used.

Figure 4:
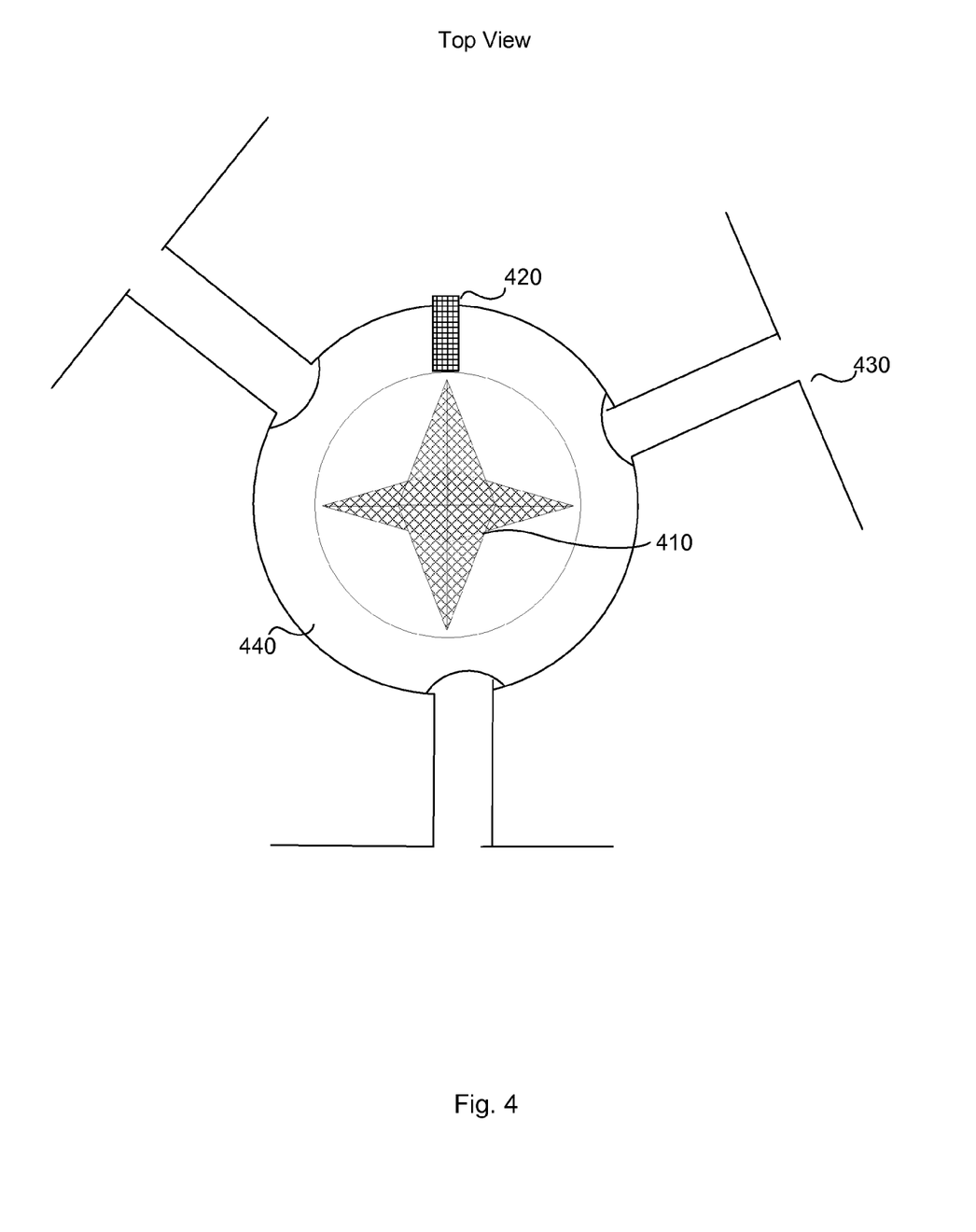
FIG. 4 is an illustration of a detail of an example hybrid energy harvesting device consistent with certain embodiments.

FIG. 4 shows an example HEHD as an illustration of a detail of the oscillating section from the top view, showing a kinetic device 410 at the center, a wireless transfer mechanism 420 mounted to a smooth and mountable exterior 440 and with the multifunctional curved and canted surfaces 430 for harvesting wind energy attached to slotted mounting sections.

Figure 5:
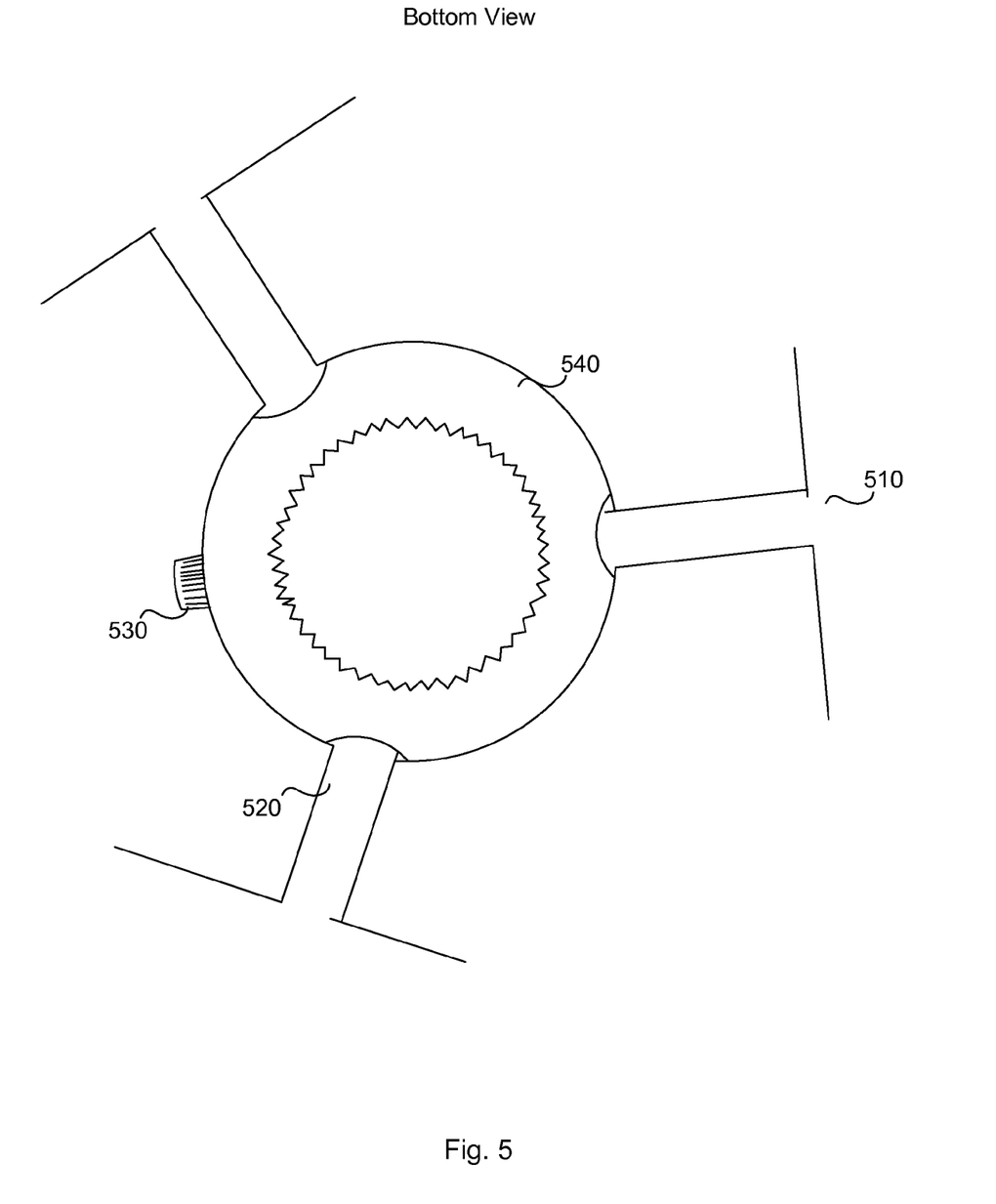
FIG. 5 is another illustration of a detail of an example hybrid energy harvesting device consistent with certain embodiments.

FIG. 5 shows another example HEHD as another illustration of a detail where the same oscillating section in FIG. 4 is viewed from the bottom. Showing the same multifunctional curved and canted surfaces 510 for harvesting wind energy and how they are attached to the slotted mounting sections 520. a view of the wireless transfer mechanism 530 not protruding at the bottom of the oscillating section 540 were the interior is cogged.

Figure 6:
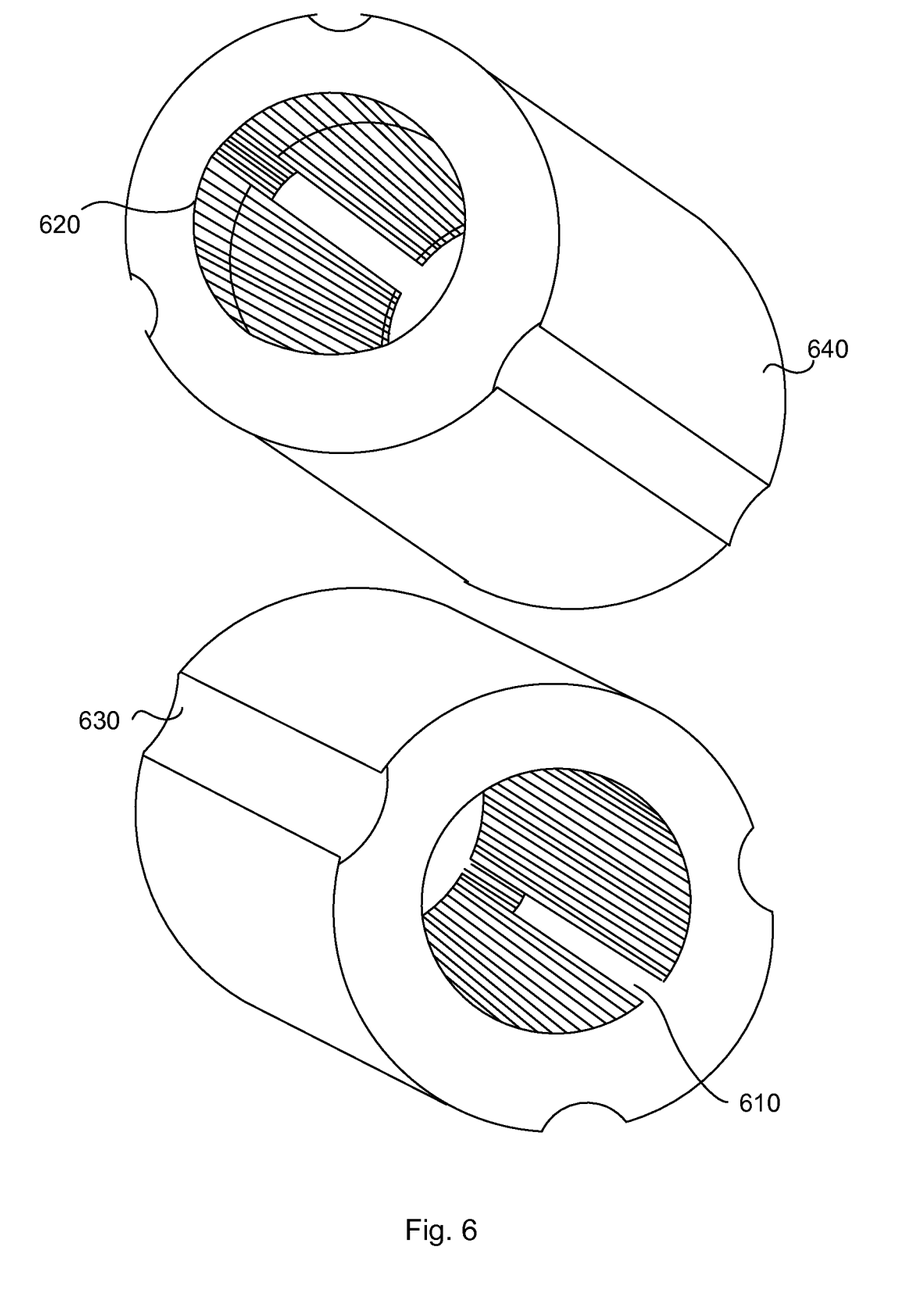
FIG. 6 is another illustration of a detail of an example hybrid energy harvesting device consistent with certain embodiments.

FIG. 6 shows another example HEHD as another illustration of a detail where the oscillating section 610 is included on the interior that can be designated for the wireless transfer mechanism, the cogged interior 620 of the oscillating section, the mounting slots 630 for wind harvesting panels or blades and the smooth and mountable exterior 640 of the oscillating section.

The wiring of HEHDs could take any number of forms.

Figure 7:
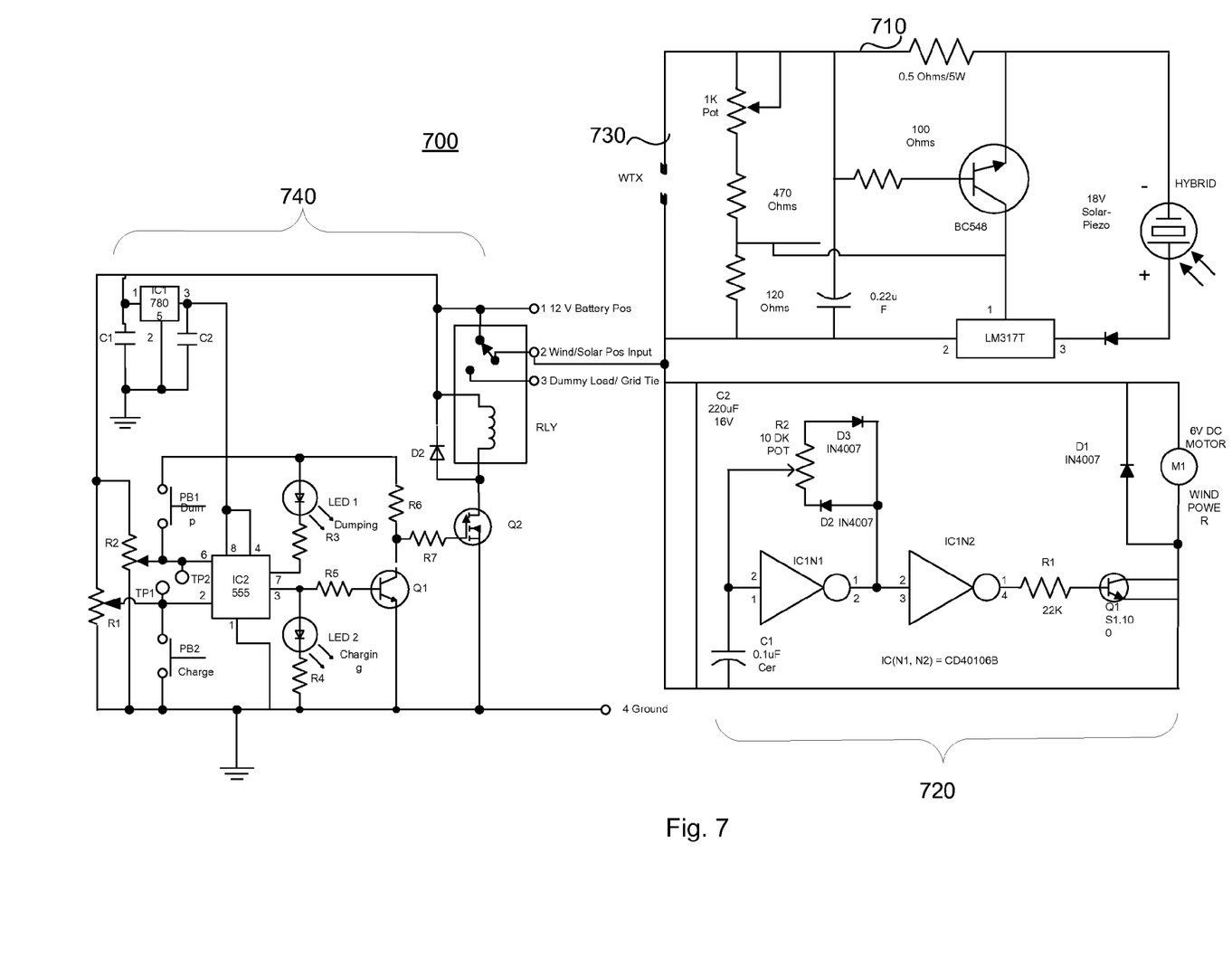
FIG. 7 is an illustration of an example wiring diagram for a hybrid energy harvesting device consistent with certain embodiments.

FIG. 7 is an example illustration of wiring diagram 700 for an HEHD expressing the ability of the device to combine the hybrid solar/kinetic 710 and wind power elements 720 to function in a parallel circuit with a wireless power transfer 730, allowing all of the energy harvested by the total device to pass through a charge control circuit 740. The new regulated power is discharged to the power grid, the storage battery and/or the electrical device for consumption.

Figure 8:
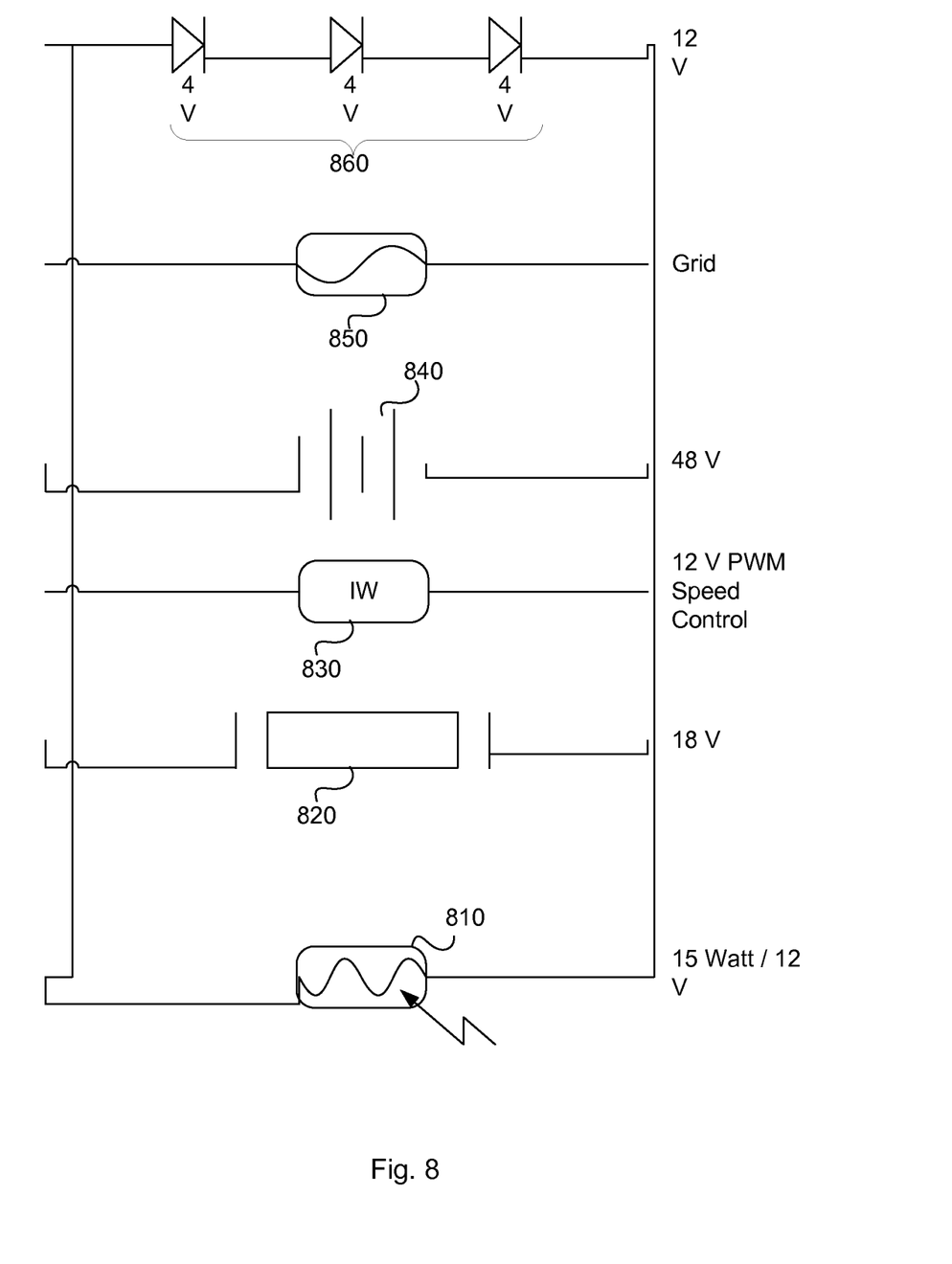
FIG. 8 is an illustration showing example wiring diagram for a hybrid energy harvesting device consistent with certain embodiments.

FIG. 8 shows another example wiring diagram for an HEHD that describes connecting 12 v solar/PV 810 and 18 v piezoelectric cells 820 and 12 v PMW for wind energy 830 in a parallel circuit to function simultaneously. The production of solar and kinetic and wind energies can be stored by a battery 840, and/or tied into the power grid 850 and/or used to power one or more LED lights 860, such as a 12 v LED light.

Fixed Threshold Power Production and Distribution

The term "fixed threshold" defines a baseline minimum power output (+0) and a maximum power output range to be determined by the design and size of any particular device. The combinations of elements used here, but not limited to are wind, solar and vibration or kinetic energy, creating an example of a "fixed threshold Hybrid Energy Harvesting Device" that has a baseline minimum power output of (+0) produced by natural energy.

For example, the Metal-Oxide-Semiconductor Field Effect Transistor ("MOSFET") may be used as a type of transistor. Strong inversion MOSFET models used for macro-scale, as on a utility scale, applications are inherently variable in terms of both demand and supply, but they are designed to cope with these variations through their grid, device configurations, control systems and interconnections. The strong inversion MOSFET model for macro-scale, as on a utility scale, applications makes the assumption that the inversion charge goes to zero when the gate voltage drops below the threshold voltage, erroneously predicting zero current. In digital circuits, sub-threshold conduction can be viewed as a parasitic leakage in a state that would ideally have no current. In terms of micro-scale, such as a single source scale, applications, parasitic leakage describes the behavior of the MOSFET in the sub-threshold regime. This sub-threshold will allow us to model transistors operating with small gate voltages, and sub-threshold is in fact an efficient operating region around which low and ultralow circuits and transistor functions are designed.

Parasitic leakage is a term used to describe electromagnetic excess. Parasitic leakage can also be defined as the passage of energy outside the path along which it was intended to work. Parasitic leakage could be considered a degradation of functionality in devices that inherently consume energy. This means when parasitic leakage is applied in terms relating to the production of energy, specifically during natural energy harvesting, there is an opportunity for any combination of devices to collectively harvest significant quantities of usable/storable energy and because of parasitic leakage the ability to continuously produce a minimum positive output. For the purpose of explaining HEHD's, parasitic leakage constitutes the presence of a small but usable supply of energy. Here, a threshold voltage level determining circuit can set a baseline allowing the HEHD electrical current gate to remain open to parasitic leakage. This action can allow the HEHD to harvest continuously among multiple sources.

Micro-harvesters such as piezoelectric transducers can generate energy in milliwatts and these are the same order of magnitude that Ultra-Low Power circuits typically consume to power personal use devices such as mobile accessories, wireless devices, or other similar devices. Piezoelectric energy resulting from pressure is also known as kinetic and vibrational energy. Vibrations from industrial machinery can also be harvested by piezoelectric materials. The combination and configuration of an HEHD can exploit and maximize the effects of parasitic leakage using Ultra-low circuit technology such as piezoelectricity on a macro or larger scale application, thus adding a useful supply of energy to any power distribution system.

Configuration of Example Devices

The following is a detailed example of the configuration of one example HEHD. Such an example includes wiring in a parallel circuit.

In one example embodiment, the wiring of the kinetic element with the solar element as described in FIG. 3 creates a hybrid surface that can function for solar and kinetic energy at approximately the same time. A series of arm bars could then be attached to a service pole or a stationary mount to hold the position of the hybrid surface above any moving or oscillating parts and can serve as a conduit for wiring.

A durable surface such as the hybrid Teflon material or another formative and durable material can be used to construct the turbine blades or panels, in one example. The panels can be curved, canted and positioned to resemble an open sphere shape with slots for wind or another shape or position intended to capitalize on 360 degrees and even bottom and top relative directional wind direction. The curvature can be equal to, plus or minus 180 degrees; the positions can be straight or canted leaving some space between panels for air flow. The panels can be mounted with hinged or fixed brackets, allowing access to the center.

A stationary Micro-phoned kinetic receiver can hang near to the center of the device from the top or bottom and can be mounted to the stationary encasement frame, to collect kinetic/acoustic energy generated by the entire device. Additionally, in one example, a ring can clamp around the service pole or conduit with arm bars positioned to hold the hybrid surface above the vertical axis turbine. The microphone could rest in the center and with sufficient space so it does not interfere with the rotation of the turbine blades or panels.

The kinetic and solar energy collected from the stationary elements can be transferred through a wireless power transfer that has its transmitter positioned above and its receiver positioned below any moving or oscillating parts on the device. The power generated from wind energy may be transported through wires at the base of the motor/turbine generator and below any moving or oscillating parts. The receiver of the wireless power transfer and the motor/generator wires can then be wired to a Power Bridge on the charge controller. The device can be connected to a service pole or mounting surface, where the sources of collection could complement one and other and increase the other in productivity.

A wireless transmitter could be used that is wired to transfer any energy produced from the hybrid surface and any other energy harvested above the motor/generator. The wireless receiver could be mounted at an optimal proximity to transfer as much of the energy recorded by the wireless transmitter as possible. The wireless receivers output could be joined by the motor/generator output at the charge control circuit.

The total of energy from all contributing elements can provide a useable supply of power to a device and/or can be stored by battery and/or can be connected to a power distribution system or smart grid for various consumer uses. These devices can be wired in a series; however the optimal wiring method is in parallel.

DC to AC Inverter Circuit

Figure 11:
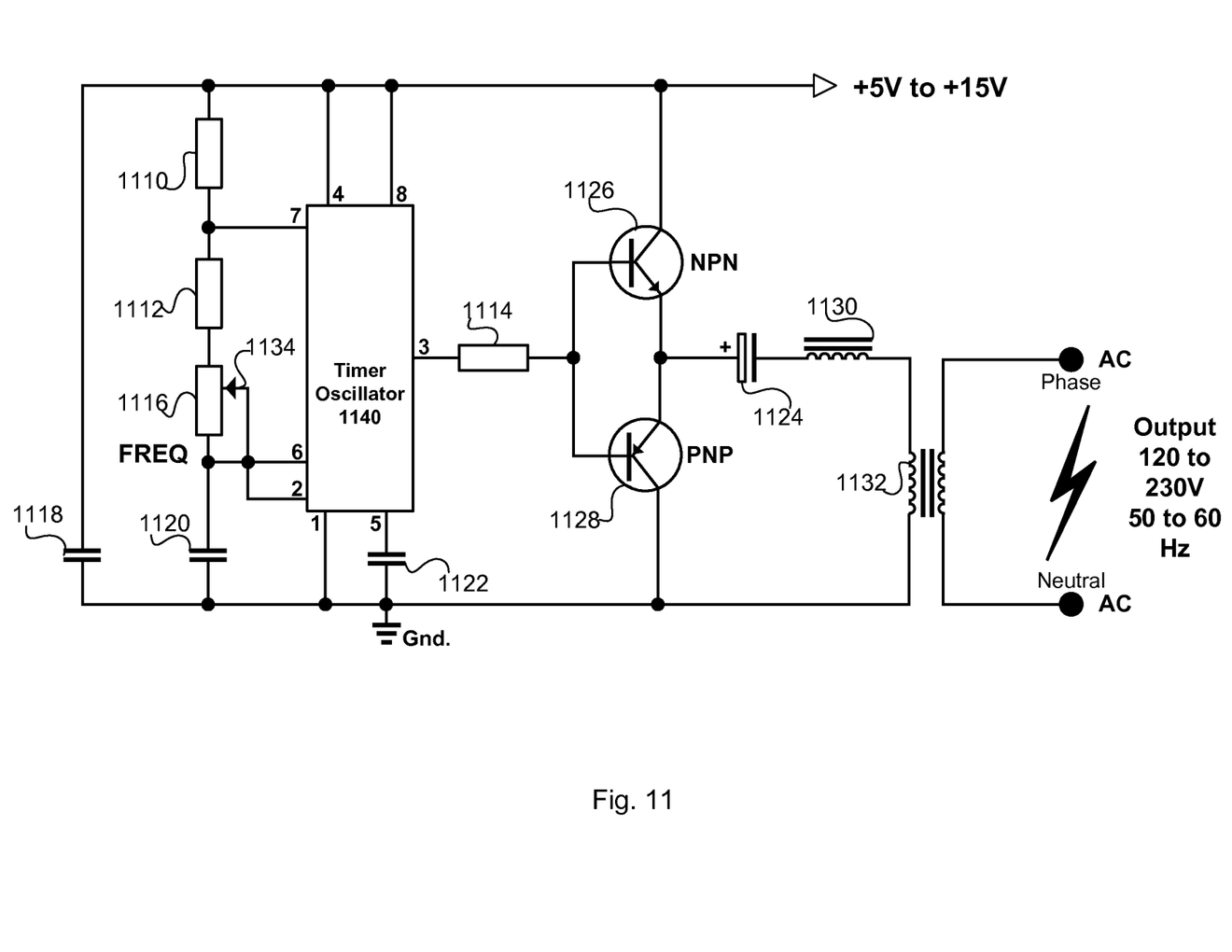
FIG. 11 shows an example circuit diagram of a DC to AC inverter consistent with certain embodiments.

FIG. 11 depicts an example DC to AC Inverter circuit including a timing circuit 1140, such as a 555 timer oscillator, which may be used in conjunction with the HEHD. This power converter can be used, for example, to connect the multiple sources of electricity from the HEHD systems into a common AC output that can connect to a power system such as an overall grid or even a smaller system such as a single building such as a home or office, without the necessity for battery storage. For our exemplary HEHD, the circuit should be placed directly after the piezo-electric device and the solar elements. The piezo and solar devices are both DC power producers and the wind is inherently an AC producer. By placing the DC to AC conversion circuit into the configuration precisely before the PWM for wind and after the first parallel circuit combining solar and piezo, the end result is a compact Hybrid AC power generator.

FIG. 11 shows an example circuit, and the parts of the circuit have, in this example the following values, 1110 is a resistor R1=10K, 1112 is resistor R2=100K, 1114 is resistor R3=100 ohm, 1116 is a linear potentiometer R4=50K 1118 and 1120 are capacitors C1 and C2=0.1 uF, 1122 is capacitor C3=0.01 uF, 1124 is capacitor C4=2700 uF, 1126 is an NPN transistor Q1=TIP41A or equivalent transistor, 1128 is a PNP transistor Q2=TIP42A or equivalent transistor, 1130 is inductor L1=1 uH, and 1132 is transformer T1=choice of Filament transformer, and Diode D1 is 1134.

The systems here can function as DC devices or AC devices or Combination AC/DC devices according to the placement and configuration of this particular inversion element. FIG. 11 shows a 12 Volt schematic which coincides with FIGS. 7 and 8 wiring schematics. FIG. 11 shows an example circuit board that can be placed according to the design configuration of each custom device, for example.

In FIG. 11, a DC-to-AC inverter schematic shows a circuit that can produce an AC output at line frequency and voltage. The timer 1140 is configured as a low-frequency oscillator, tunable over the frequency range of 50 to 60 Hz by Frequency potentiometer 1116, for example.

The timer 140 can feed its output, amplified by transistor 1126 and transistor 1128, to the input of transformer 1132, a reverse-connected filament transformer with the necessary step-up turn's ratio. Capacitor 1124 and inductor 1130 filter the input to transformer 1132, assuring that it is effectively a sine wave. The value of 1132 T1 can be adjusted to the required voltage.

Operating a renewable energy system in parallel with an electric grid can require special grid-interactive or Grid Tie Inverters (GTI). The power processing circuits of a GTI can be similar to that of a conventional portable DC-AC converter that operates as a stand-alone device. Some differences may be in their control algorithm and safety features. A GTI takes a variable voltage from a DC source, such as solar panels array or a wind system, and inverts it to AC synchronized with the mains. It can provide power to a load and feed an excess of the electricity into the grid. Depending on power and voltage levels, GTIs circuits normally have from one to three stages. A simplified power train schematic diagram in FIG. 11 illustrates the principles of operation of a three-stage grid tie inverter. Such a topology can be useful for low-voltage inputs, such as 12V, in grounded systems. The control circuits and miscellaneous details are not shown here. Other examples could also include two-stage and single-stage configurations.

In FIG. 11, the input voltage is first raised by the boost converter formed with inductor 1130, transistor 1126, diode 1134 and capacitor 1120. If a PV array is rated for more than 50V, generally one of the input direct current busses has to be grounded per National Electric Code®. The NEC® however allows some exceptions discussed below. Although in theory either of two busses can be connected to earth, usually it is a negative one. If DC input has conduction pass to ground, the output AC conductors in utility-interactive configurations should be isolated from DC.

In our example, a galvanic isolation is provided by a high frequency transformer in the second conversion stage. This stage is a pulse-width modulated DC-DC converter. FIG. 11 shows a full bridge, also known as H-bridge, isolating converter comprised of (not pictured), Q2-Q5, T1, D2-D5, L2, and C3. For power levels under 1000 watts, it could also be a half-bridge or a forward converter. Some commercial models use low-frequency (LF) transformer in the output stage instead of a high frequency one in the DC-DC section. With such a method, input is converted to 60 Hz AC, and then a LF transformer changes it to a required level and provides isolation at the same time. The system with an LF transformer has a significantly larger weight and size, but it will not inject a DC component into the load.

Another modification is contemplated where regulation UL 1741 allows transformer-less inverters and exempts them from dielectric voltage withstand test between input and output. In this case, the isolating stage can be eliminated. Conductors from PV array in non-isolated designs can't be bonded to earth. NEC® 690.41 allows ungrounded configurations as they comply with Article 690.35. The transformer-less inverter can feature lower weight and cost. They can be used in areas where ungrounded electrical systems are common.

Transformer 1132, can be a so-called step-up type to amplify the input voltage. With a step-up transformer 1132, the first stage (boost converter) may be omitted. However, high turns ratio leads to large leakage inductance.

The regulated converter provides a DC-link to the output AC inverter. Its value should be higher than the peak of the utility AC voltage. For example, for 120VAC service, the Vdc should be >120*√2=168V. Typical numbers are 180-200V. For 240VAC you would need 350-400 V. For 240VAC the range would be 350-400 V.

In another example, not pictured, the third conversion stage turns DC into AC by using another full bridge converter. It can consist of IGBT Q6-Q9 and LC-filter L3, C4, for example.

Further describing the example not pictured the IGBTs Q6-Q9 work as electronic switches that operate in PWM mode. This topology requires anti-parallel freewheeling diodes to provide an alternate path for the current when the switches are off. These diodes are either included within IGBTs or added externally. By controlling different switches in the H-bridge, a positive, negative, or zero potential can be applied across inductor L3. The output LC filter then reduces high frequency harmonics to produce a sine wave.

A GTI also has to provide so-called anti-islanding protection. When mains fails or when its voltage level or frequency goes outside of acceptable limits, the automatic switch should SW quickly disconnect the system output from the line. The clearing time depends on the mains conditions and is specified by UL 1741. In the worse cases, when utility voltage drops below 0.5 of nominal, or its frequency deviates by +0.5 or −0.7 Hz from the rated value, GTI should cease to export power back to the grid in less than 100 milliseconds. An anti-islanding can be accomplished for example via AC under voltage or output overcurrent detection functions. Our example depicts a system with power backup option: when contactor SW opens, the GTI will supply critical loads connected to the sub-panel.

Deployment of Hybrid Devices

Thus, by employing many hybrid devices, a steady and near-constant source of low power can be produced. Such a network of interconnected devices can be deployed over a vast geographic region, tied into the existing power grid, or over an area where the devices are linked by a proprietary network.

The example devices here could bear a fixed range threshold for scalable energy harvesting applications. Objectively smaller elemental harvesting, devices, techniques or combinations could provide a controllable threshold for natural energy ranging from an ultra-low Volt-Amp (less than 1.2 VA) and ranging above zero Volt-Amp (+0 VA). Generated power potential can be determined by size, design and/or implementation strategy.

The VAEHT example shows combinations of harvesting elements that can sustain a minimum voltage output ranging above zero Volt-Amps (+0 VA) and reaching maximum voltages determined by design, size, implementation and the combination of natural resources available.

Deployment of the HEHDs in a network could include placement on municipality property such as existing lamp posts or street signs for smaller units. Deployment could include farms of devices placed in areas where strong and prevailing winds could keep the wind turbines spinning and areas where sunlight is prevalent and common. Coastal deployment on sea level or bluffs could produce these kinds of conditions, for example. The farms could be on land or at sea, where platforms, barges, sea walls, or break walls could serve as deployment positions.

Large or macro-scale harvesting applications such as wind and solar farms typically add kilowatts or megawatts to the power distribution system. Depending on the size and design configuration, a single HEHD can generate power ranging from milliwatts or micro-scale such as single source, to megawatts or macro-scale, such as utility, quantities of natural energy.

Conversely, an HEHD device can be designed for macro or micro-scale harvesting. A smaller device can be wired into a service grid, thus making multiple micro-scale devices a macro-scale system for energy harvesting.

Thus, a single harvesting sources such as solar or wind or piezoelectric technology can power a single device such as a street light independently of the power grid. The configuration of the HEHD combining a multiple of harvesting sources can create an opportunity to produce a massive residual supply of energy. The smart grid permits greater penetration of the HEHD with or without the addition of energy storage. There are specific interconnection criteria to each infrastructure for allowing residual energy above or below 10 kilowatts to be interconnected to the grid.

In relation to HEHD'S and parasitic leakage this means, when implemented strategically smaller scaled devices can be constructed in a manner that allows them to convert an energy consumption infrastructure, for example, a city street lighting grid, into a large scale energy producing infrastructure by affixing an HEHD to each streetlight service pole on the grid. An exemplary HEHD configuration consisting of 15 W/12V—Solar, 18V—Piezoelectric, and 12V—PMW for wind, can modify devices such as a common 12V city street light by affixing to the existing service pole to sustain illumination independent of the power distribution system for multiple uninterrupted hours, or stored to a 24V rechargeable battery or a connected to a smart grid power distribution system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for harvesting energy, comprising:
   a turbine having a base, at least two protruding blades, and a center portion;

wherein the turbine base is configured to be rotatable and connected to an electric motor configured to generate power;

wherein the at least two protruding blades are configured to attach to the base and include solar energy collection devices;

wherein the center portion is configured to attach to the base and include a kinetic energy harvesting device; and wherein the electric motor, the solar collection devices and the kinetic energy harvesting device are connected to a home circuit.

2. The system of claim 1 further comprising a grid-tie inverter provided between the home circuit and an electric grid.

3. The system of claim 2, wherein the grid-tie inverter includes from one to three stages.

4. The system of claim 2, wherein the grid-tie inverter includes a boost converter stage.

5. The system of claim 2, wherein the grid-tie inverter includes a pulse-modulated DC-to-DC converter stage.

6. The system of claim 2, wherein the grid-tie inverter includes a DC-to-AC conversion stage.

7. The system of claim 1 wherein the at least two protruding blades extend upwardly from the base each have two portions, one angled out from the base, and the other angled back into the base.

8. The system of claim 1 wherein the at least two protruding blades extend from the rotatable base to a commonly shared portion, the commonly shared portion connecting the at least two protruding blades with the kinetic energy harvesting device.

9. The system of claim 1 wherein the system includes at least two energy harvesting devices, connected by a network.

10. The system of claim 9 wherein the network is at least one of a wireless and a wired network.

11. The system of claim 10 wherein the network is connected to an energy storage system, configured to receive the harvested energy from the networked system.

12. The system of claim 1 wherein the home circuit is configured to produce consistent voltage output.

13. The system of claim 1 further comprising a threshold voltage level determining circuit connected to the home circuit.

14. The system of claim 1 wherein the kinetic energy harvesting device is at least one of a piezoelectric device and a microphone device.

15. The system of claim 1, wherein the electric motor, the solar collection devices and the kinetic energy harvesting devices are connected in parallel to the home circuit.

16. The system of claim 1, wherein the electric motor, the solar collections devices, the kinetic energy harvesting devices, a power grid and an electrical device are connected in parallel.

17. The system of claim 1, wherein the home circuit includes a charge control circuit regulating and discharging harvested energy to at least one of a battery, a power grid and electrical device.

18. A system for harvesting energy, comprising:
a hybrid energy harvesting device having a base, a turbine with at least one vertically arranged and angled protruding blade, and a center portion;
wherein the base is configured to be rotatable and in connection to an electric generator;
wherein the at least one protruding blade is configured to include solar energy collection portions;
wherein the center portion is configured to include a kinetic energy harvesting device.

19. A method of harvesting energy, comprising:
via a hybrid energy harvesting device,
generating energy from a spinning a turbine;
collecting solar energy from a solar collection device; and
collecting kinetic energy from a kinetic energy harvesting device,
wherein the turbine having at least two vertically arranged blades mounted on a rotatable base;
wherein the at least two turbine blades configured to include solar collection portions.

20. The method of claim 19 further comprising, via the hybrid energy harvesting device,
transferring the energy via a home circuit in communication with a grid-tie inverter to an electric grid.

* * * * *